United States Patent
Parikh et al.

(10) Patent No.: US 9,633,159 B1
(45) Date of Patent: Apr. 25, 2017

(54) METHOD AND SYSTEM FOR PERFORMING DISTRIBUTED TIMING SIGNOFF AND OPTIMIZATION

(71) Applicant: Cadence Design Systems, Inc., San Jose, CA (US)

(72) Inventors: Vipul Parikh, Greater Noida (IN); Lalit Bharat, Noida (IN); Shagufta Siddique, Noida (IN); Prashant Sethia, Noida (IN); Naresh Kumar, Greater Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/701,193

(22) Filed: Apr. 30, 2015

(51) Int. Cl.
G06F 17/50 (2006.01)

(52) U.S. Cl.
CPC ...... *G06F 17/5068* (2013.01); *G06F 2217/84* (2013.01)

(58) Field of Classification Search
CPC ............. G06F 17/5031; G06F 17/5045; G06F 2217/12; G06F 2217/84

USPC ................. 716/100–108, 132, 134
See application file for complete search history.

(56) References Cited

U.S. PATENT DOCUMENTS

| | | | | |
|---|---|---|---|---|
| 8,875,082 B1* | 10/2014 | Sircar | ........................... | 716/110 |
| 2010/0050144 A1* | 2/2010 | Zahn | .................. | G06F 17/5031 716/119 |
| 2011/0055793 A1* | 3/2011 | Buck | .................. | G06F 17/5031 716/136 |
| 2011/0252390 A1* | 10/2011 | Sripada | ............... | G06F 17/5022 716/113 |
| 2013/0080986 A1* | 3/2013 | Tetelbaum | .......... | G06F 17/5031 716/113 |

* cited by examiner

*Primary Examiner* — Paul Dinh
(74) *Attorney, Agent, or Firm* — Vista IP Law Group, LLP

(57) ABSTRACT

Disclosed is an improved approach to implement timing signoff and optimization. Integrated MMMC timing closure functionality is provided in a single software session. The system provides the capability to perform signoff analysis, debugging, ECO, and TSO optimization for a large number of MMMC views in single software session.

30 Claims, 6 Drawing Sheets

METHOD AND SYSTEM FOR PERFORMING DISTRIBUTED TIMING SIGNOFF AND OPTIMIZATION

BACKGROUND

The invention is directed to an improved approach for designing, analyzing, and manufacturing integrated circuits.

An integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes, for example, interconnections of nodes and components on the chip and includes information of circuit primitives such as transistors and diodes, their sizes and interconnections.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. After an integrated circuit designer has created the physical design of the circuit, the integrated circuit designer then verifies and optimizes the design using a set of EDA testing and analysis tools.

Rapid developments in the technology and equipment used to manufacture semiconductor ICs have allowed electronics manufacturers to create smaller and more densely packed chips in which the IC components, such as wires, are located very close together. When electrical components are spaced close together, the electrical characteristics or operation of one component may affect the electrical characteristics or operation of its neighboring components, which may negatively affect the timing characteristics of the circuit design. Therefore, one of the key steps in the modern circuit design process is to perform "timing closure", to ensure that the timing characteristics of the circuit design will meet expected operating requirements.

To perform timing closure, numerous actions are typically taken, including MMMC analysis, where "MMMC" stands for "Multi-Mode Multi-Corner" (which may also be referred to as MCMM or Multi-Corner Multi-Mode). MMMC refers to a design configuration consisting of various functional mode(s) and process corner(s) required to analyze semiconductor design to ensure achieve timing closure. The timing closure process may also include performance of STA (Signoff Timing Analysis) and ECOs (engineering change orders). STA refers to technique of static timing and signal integrity analysis for semiconductor design to measure same be able to run at intended speed (clock frequency) An ECO (engineering change order) refers to incremental netlist changes performed to meet timing closure. Timing closure is the practice that typically includes the above actions for digital circuit designs to ensure that the circuit design meets timing specifications.

As designs move towards lower process technology, timing closure has become a quite challenging. Due to increased number of process variations in lower technologies, a two corner analysis for worst and best PVT (process, voltage, temperature) conditions can result in highly pessimistic analysis. At lower technologies, designs are targeted to close timing at huge number of modes and corner combinations (called views). Different combination of Process/Voltage and Temperature results in exploded number of corners that need to be analyzed for each design. Therefore, the number of process corners has increased exponentially, resulting in many numbers of corners per analysis mode. With the increased number of corners, full chip analysis for all the modes becomes a bottleneck as large numbers of STA runs increasingly affects and extends the design timing closure cycle. Analyzing static timing and signal integrity effects on large numbers of runs (due to the large number of number of MMMC views in modern designs) adds a performance bottleneck to the design system. To address this problem, a circuit designer may decide to avoid performing SI (signal integrity) analysis for all modes to reduce design closure time. Instead of performing this analysis for all modes, the circuit designer may choose place high guard bands (timing derates) to add pessimism that can cover SI effects. This approach may avoid the bottleneck of performing analysis for all corners, but may result in negative effects on the overall QOR (quality of results) of the design.

Therefore, it is clear that there is a need for an improved approach to perform timing closure and optimization.

SUMMARY

According to some embodiments of the invention, the present disclosure provides an improved approach to implement timing signoff and optimization. The present embodiment provides integrated MMMC timing closure functionality in a single software session. The inventive system provides the capability to perform functions such as signoff analysis, debugging, ECO, and TSO optimization for a large number of MMMC views in single software session. This is highly sought-after functionality improvement over previous solutions (2-pass or 3-pass) that required multiple software sessions.

For the ECO-DB Data, instead of requiring the user to generate the ECO-DB per view to start the optimization step, the TSO master auto-triggers ECO-DB generation on clients in parallel to loading MMMC design on master. In the inventive system, ECOs are performed on smaller set of MMMC views while keeping all the views netlist data consistent. This provides the capability to interactively analyze and perform manual ECOs on smaller set of MMMC views of user's interest. The user can then switch from the smaller set of MMMC views to a complete view of the electronic design.

In some embodiments, the ECOs performed on selected critical views can be pushed to remaining views in fast update manner to keep all MMMC Views clients DB in sync but does not incur significant cost of DB sync. In some embodiments, consecutive TSO optimization iterations can be performed in the same software session. Some embodiments permits the creation of concurrent MMMC view-configurations dynamically from existing non-MMMC STA sessions. Some embodiments perform automated ECO-DB generation at clients in parallel to the TSO master setup. Some embodiments pertain to an approach for implementing a physical TSO database using existing logical STA sessions.

Other and additional objects, features, and advantages of the invention are described in the detailed description, figures, and claims.

DETAILED DESCRIPTION

As previously discussed, performing timing signoff for a large number of views is a significantly complex and time-consuming task. The challenge is to be able to efficiently handle large numbers of MMMC views through timing signoff iterations, since this process has a significant bearing on the time to closure.

According to some embodiments of the invention, the present disclosure provides an improved approach to implement timing signoff and optimization. The present embodiment provides integrated MMMC timing closure functionality in a single software session. The inventive system provides the capability to perform functions such as signoff analysis, debugging, ECO, and TSO optimization for a large number of MMMC views in single software session. This is highly sought-after functionality improvement over alternate solutions (2-pass or 3-pass) that required multiple software sessions.

It is helpful at this point to describe some alternative approaches to perform timing signoff which are improved upon by the embodiments of the present invention. To handle timing signoff with many views, some alternatively possible approaches include using 2-pass or 3-pass flows.

Figure 1B:
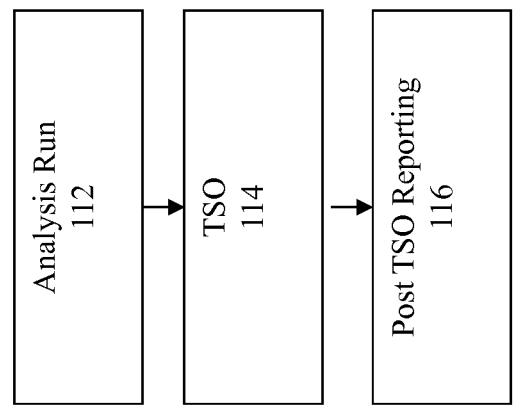
FIG. 1B illustrates an approach to implement a three-pass signoff timing closure flow.
Figure 1A:
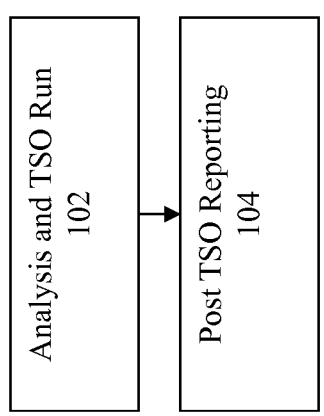
FIG. 1A illustrates an approach to implement a two-pass signoff timing closure flow.

FIG. 1A illustrates an approach to implement a two-pass signoff timing closure flow. In the first pass 102 for performing analysis and a TSO run, a session is run with all views' data on a master which internally launches clients in distributed mode to perform analysis and ECO-DB generation. The TSO is then run on the master. This first pass includes actions to (a) read the MMMC design, (b) run signoff STA, (c) generate an ECO timing DB (ECO-DB), and (d) run TSO. In the second pass 104 to perform post-TSO reporting, the analysis is run again including reading ECOs generated from above steps for each view independently, generate timing report and performance of timing debugging. This second pass include actions to (a) read the MMMC design, (b) source the ECO file, (c) run signoff STA, and (d) generate a timing report. The first pass essentially generates the ECO file/ECO changes that are used by the second pass to perform the design fixing.

FIG. 1B illustrates an approach to implement a three-pass signoff timing closure flow. In the first pass 112 to perform an analysis run, the analysis is performed for each view independently and to save an ECO timing DB (ECO-DB) of interest for critical views. This first pass includes actions to (a) read the design, (b) run signoff STA, (c) optionally perform a manual ECO, and (d) generate an ECO-DB. In the second pass 114 to perform the TSO, a new session is started with all views concurrently active to run the TSO. This second pass includes actions to (a) read the MMMC design, (b) load the ECO-DB, and (c) run TSO. In the third pass 116 to perform post-TSO reporting, the analysis is run again, including reading ECOs from step 114 for each view independently, and to then generate a timing report and perform timing debugging. This third pass includes actions to (a) read the MMMC design, (b) source the ECO file, (c) run signoff STA, and (d) generate a timing report.

There are challenges to both of these approaches. One particular challenge is that the different passes are run in different and distinct tool sessions. If multiple iterations of signoff ECO fixing are desired, a new tool session is required to start/exit to achieve signoff accuracy of the ECO being identified. In addition, performing manual ECO may require a complex setup as it cannot be performed in session performing TSO run (Pass1 in 2-pass flow and Pass2 in 3-pass flow) due to missing full timing information.

Another challenge is that these approaches may require a complex set-up process. For example, to create/maintain MMMC configuration for a large number (e.g., 1000+) of views requires a significant in-depth understanding of each corner, e.g., to make sure that the large number of data files do not contain incorrect or incomplete data. In addition, complex configuration/scripts may be needed to manage launching many views. Manual interventions may also be needed, which is problematic since a manual process may be error-prone and can result in missing specification or wrong application that may not produce correct ECOs. Usability issues may also arise with these approaches, since the directory structure for reports generated by each view may need to be managed via additional scripting which tends to become quite complex. Moreover, additional ECO-DB generation may be necessary to feed an optimizer that the user cannot interpret and hence there is no way to proactively perform validation relative to the ECO-DB.

Embodiments of the present invention provide an improved approach to implement timing signoff and optimization that addresses these problems. The present embodiment provides integrated MMMC timing closure functionality in a single software session. The inventive system provides the capability to perform functions such as signoff analysis, debugging, ECO, and TSO optimization for a large number of MMMC views in single software session. This is highly sought-after functionality improvement over previous solutions (2-pass or 3-pass) that required multiple software sessions.

Figure 2:
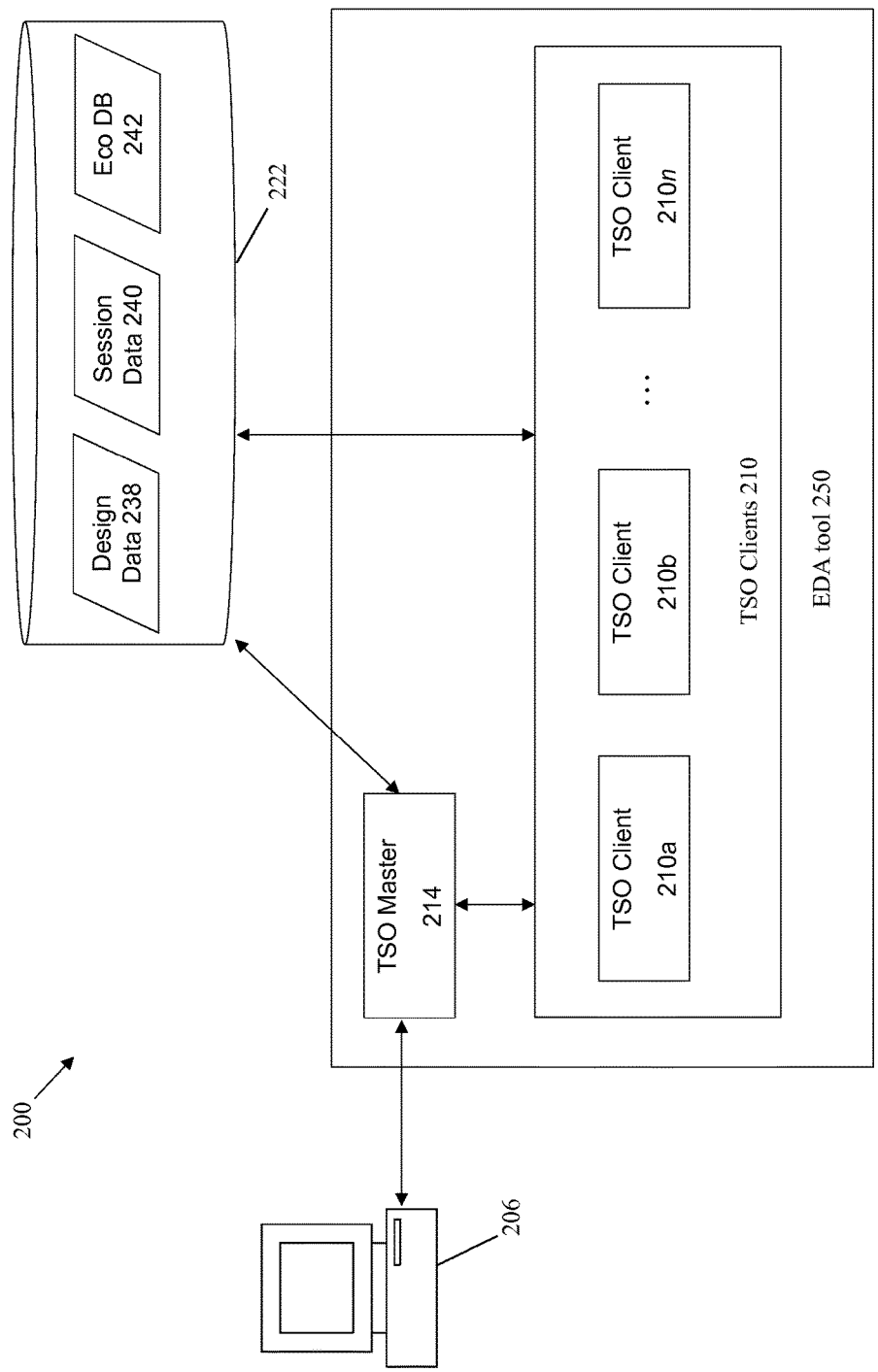
FIG. 2 provides a high level illustration of a system to implement some embodiments of the invention.

FIG. 2 provides a high level illustration of a system 200 to implement some embodiments of the invention. System 200 may include one or more users at one or more user station(s) 206 that operate the system 200 to design or verify the electronic design 238. Such users include, for example, design engineers or verification engineers. User station 206 comprises any type of computing station that may be used to operate, interface with, or implement EDA applications or devices, such as EDA (electronic design automation) tool 250. Examples of such user stations 206 include for example, workstations, personal computers, or remote computing terminals. User station 206 comprises a display device, such as a display monitor, for displaying electronic design analysis results to users at the user station 206. User station 206 also comprises one or more input devices for the user to provide operational control over the activities of system 200, such as a mouse or keyboard to manipulate a pointing object in a graphical user interface.

The electronic design 238 may be stored in a computer readable storage device 222. The electronic design 238 corresponds to any form of electrical design data that needs to be analyzed by the EDA tool 250. For example, electronic design 238 may include data in the form of view definitions, MMMC configurations, timing properties, Verilog data, LEF/DEF data files, and/or scripts. Computer readable storage device 222 includes any combination of hardware and/or software that allows for ready access to the data that is located at the computer readable storage device 222. For example, computer readable storage device 222 could be implemented as computer memory operatively managed by an operating system. The computer readable storage device 222 could also be implemented as an electronic database system having storage on persistent and/or non-persistent storage.

One or more EDA tools 250 may be used by users at a user station 206 to analyze the electronic design data 238 and to perform timing signoff and optimization upon that design data. In an integrated tool session for the EDA tool 250, a TSO master 214 may operate in conjunction with multiple TSO clients 210a, 210b, . . . 210n. The multiple TSO clients 210 can be launched in parallel to the TSO master 214, and session data 240 is generated that is accessible between these parallel and/or concurrently running entities. The ECO-DB 242 is generated by the TSO clients 210 and consumed by the TSO master 214 to run timing signoff optimization within the same tool session.

Figure 3:
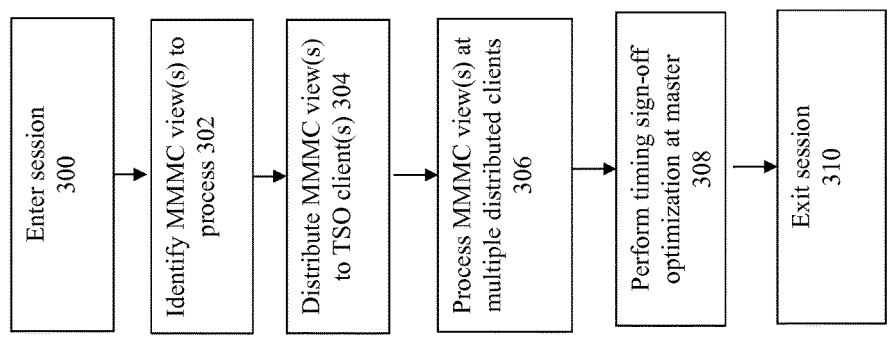
FIG. 3 shows a flowchart of an approach to implement some embodiments of the invention.

FIG. 3 shows a flowchart of an approach to implement some embodiments of the invention. At 300, a tool session is entered for the timing processing. At 302, one or more MMMC views are identified for processing. The MMMC views pertain to the different mode and corner combinations with regards to different combination of Process/Voltage and Temperature that are to be analyzed for the design. Modifications to the electronic design are generated at the master plurality of entities and the modifications to the electronic design are received at the client processing entities for processing.

At 304, the MMMC views are distributed to the TSO clients for handling within the integrated tool session. The TSO clients are distributed processing entities that operate to process its respective MMMC views and to generate the ECO-DBs. The TSO clients may be implemented as any suitable type of processing entity. For example, the TSO client may be implemented as a processing node within a network, as a separate hardware processor, as a process in a multiprocessing system, as a thread, as a task, or any other type of entity that can be used to perform processing in a computing system. Examples of possible approaches to implement the additional processing on the client include, e.g., rsh, ssh, lsf, localCpu, and/or other custom protocols.

The process runs as an integrated software session, where the user interacts with a master processing entity, and the master processing entity interacts with a plurality of client entities that are started. The client entities do not correspond to independent sessions, but are instead attached to the master session. The client entities may be started as separate instances of software tools, but are integrated into the same single master session. In some embodiments, this is accomplished by having the master entity create a TCP/IP connection over the network, and where the client entities start and are tied/hooked into the master's TCP/IP connection.

At 306, the different TSO clients will process the MMMC views. In some embodiments, a single view is sent for handling by each TSO client. In an alternate embodiment, multiple views are sent to the TSO clients for processing. The views can be processed concurrently by parallel TSO clients. Alternatively, some or all of the views may be handled asynchronously by the TSO clients, even while being handled within the same tool session. Any ECO/Netlist change is stored for access by the TSO master, since such ECO or netlist changes may have a direct impact on timing signoff for most of the MMMC analysis views.

At 308, the timing signoff optimization is performed at the TSO master. The ECO-DBs generated by the different TSO clients are accessed and are used by the TSO master to perform the timing signoff and optimization. For example, the TSO client may perform static timing analysis to ensure that the clocks and signals within the electronic design are correctly timed, and to implement optimizations for the timing signoff closure. Any ECO/Netlist change made by a TSO master is accessed by the TSO client within the integrated tool session to analyze and optimize for the impact of the ECO/change on critical views, and also account for and optimize for its impacts on leakage power and area of the design (power/performance/area). At 310, the process exits from the integrated session.

This approach therefore provides tighter integration of MMMC signoff analysis and ECO fixing, as well as providing for the re-use of data for improved usability and reduced complexity. In addition, the parallel distributed run model of the present embodiment allows for faster timing closure to improve performance.

Figure 4:
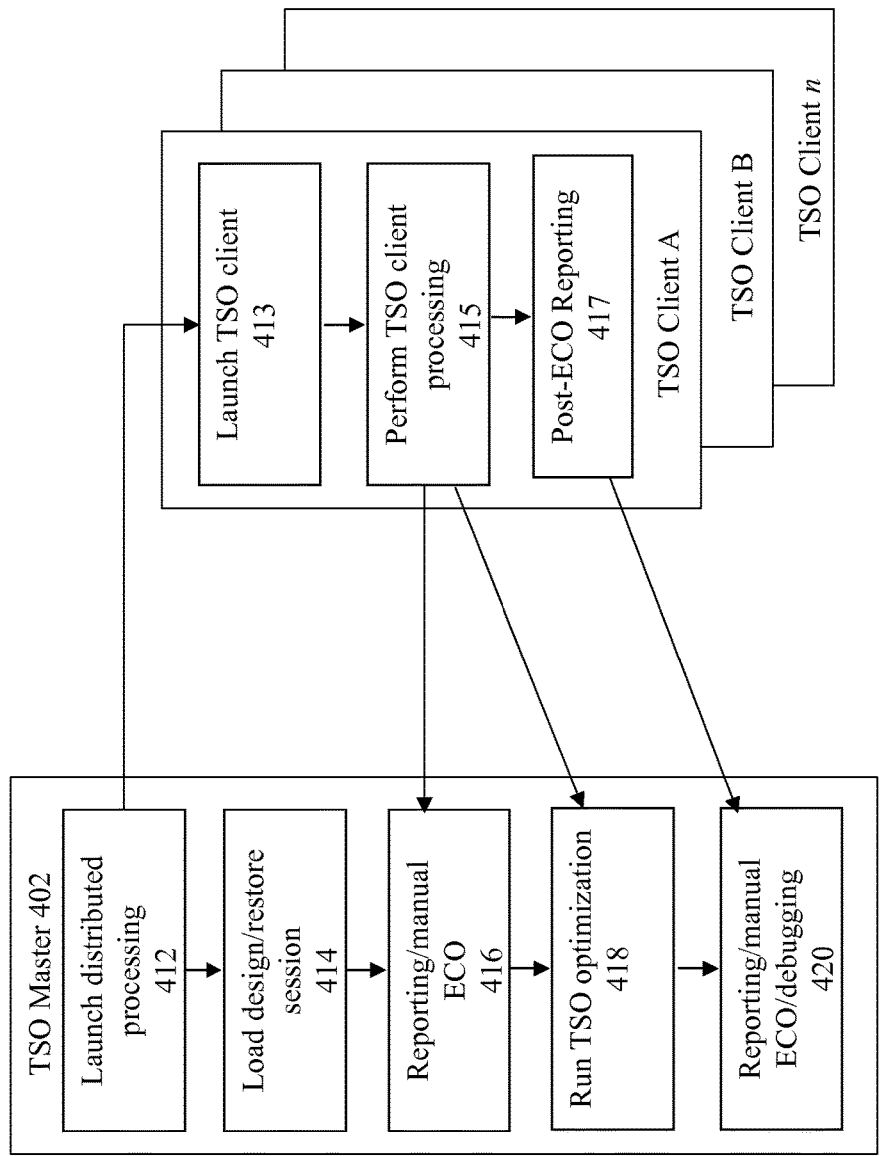
FIG. 4 provides a more detailed illustration of an approach to implement some embodiments of the invention.

FIG. 4 provides a more detailed illustration of an approach to implement some embodiments of the invention. Portion 402 identifies the actions performed on the TSO master. At 412, the software session is triggered by starting the EDA tool process (referred as herein as "TSO master") that acts as controller for the complete flow and performs certain master processing tasks. Identification is made of MMMC view configuration and a set of MMMC views to perform timing signoff based at least in part on user inputs. In addition, identification is made of a configuration of hardware resources/machines over the network (e.g., from user inputs). The process then submits multiple remote processes (TSO clients) over the network which connects back to the controller machine (e.g., the TSO master), causing the launch 413 of multiple TSO clients A, B, . . . n. At the master TSO, at 414, the master TSO can load the design and/or restore a saved session. This permits multiple teams to work upon the same design, e.g., one team to implement ECOs and another team to implement timing fixes/optimizations.

Sets of MMMC view configurations are assigned to clients and to run MMMC timing analysis in parallel on clients (e.g., remote machines) at 415. This may involve distribution of a script from the TSO master to the TSO client having commands and data to perform the client processing. The distribution will include one or more views, (view definition data), timing properties, and/or design data. At each client, the script is executed to perform the client processing. This may involve the load/restoration of a saved session and the generation of an ECO-DB. Batch processing may also be performed by the TSO clients.

At 417, the TSO client generates post-ECO reporting. Any suitable type of reporting may be implemented at 417.

The process allows concurrent MMMC configuration to be read at the master in parallel to the client runs. At 416, reporting and/or manual ECOs are performed at the master TSO. In addition, at 418, timing signoff optimization is run at the TSO master. In some embodiments, an interactive prompt/access is provided for the user to perform signoff reporting. The manual ECO, TSO-ECO run can therefore be operated within a single session in parallel for large number of views.

At 420, additional processing may be performed at the master, including many of the same actions previously taken at 416 to perform reporting, manual ECOs, and/or debugging. The idea is that the clients are kept alive so that additional interactive access is provided for additional actions that may need to be performed. This permits additional processing to be performed within the same interactive session. Such additional actions include, for example, reporting, manual ECOs, sourcing of the ECO file, debugging, and generation of signoff data.

This approach therefore provides significant usability and performance boost for MMMC designs timing closure. This approach permits users to manage timing closure for a large number of views in single software session as compared to combination of individual full chip runs and ECO iterations.

Figure 5:
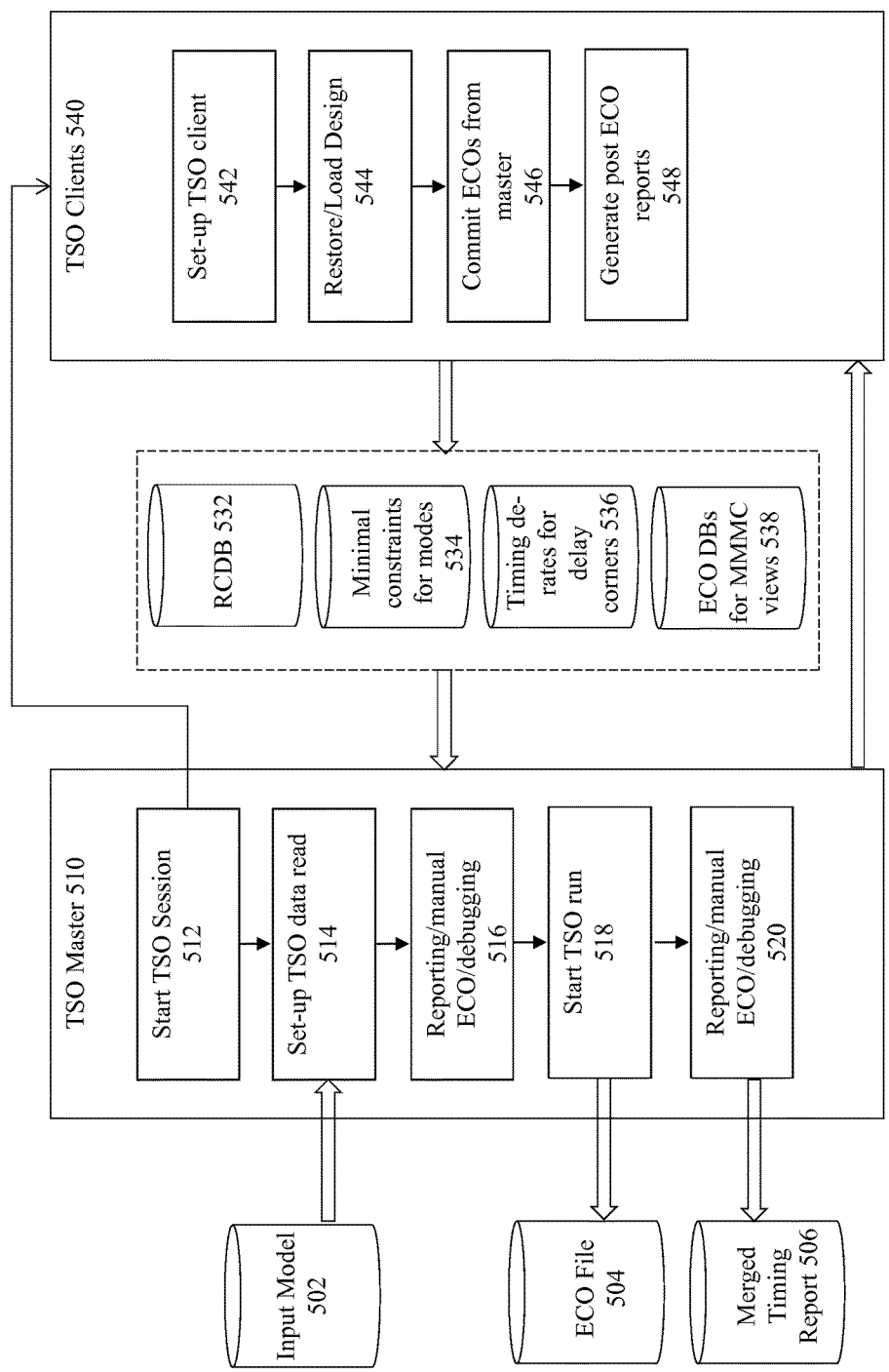
FIG. 5 illustrates a detailed system or implementing some embodiments of the invention.

FIG. 5 illustrates a detailed system or implementing some embodiments of the invention. Various input models 502 are provided and consumed by the system. For example, machine configuration data can be provided that includes specification about methods for invoking jobs on remote machine (e.g. rsh/ssh/lsf etc.) In addition, MMMC configuration data is included as inputs, which contains specification for set of Multi-Mode-Multi-Corner Analysis Views. Each MMMC View includes functional mode, delay corner and parasitic corner and library in syntax that identifying each entity by unique names provided from users. A gate netlist is provided, which corresponds to a model that defines the digital circuit that is being envisioned. Generally a gate level netlist is provided as an input model to define the desired functionality. Library models may also be provided, which include various kinds of library models that are used to perform static timing analysis. Some example libraries are in formats specified the .lib library models for defining the delays of standard digital gates (e.g., AND, OR, NOT, FLOP, and LATCH) and MACROS, AOCV (advanced on chip variation or location-based OCV), and/or SOCV (statistical on chip variation), Waveform models for performing advanced STA, CDB (common database) models for performing glitch analysis. Timing derate tables may be included as inputs, which provide means to model the variation impact generally during STA. Physical data and context-aware rules may also be provided, which include geometry and placement information for gated/cells part of a design netlist, e.g., LEF (Library Exchange Format), DEF (Design Exchange Format), floor-plan, placement, routing, context aware rules data etc. Parasitic data may also be included, which, for interconnects, pertain to models that can be specified in the SPEF (standard parasitic exchange format)/RCDB (RC database) format. A power domain specification may be provided, which includes a set of input specifications defining power intent for part or full design associating them to require library models for multi supply voltage design or otherwise for precise instruction to perform analysis at user desired voltage. A SDF (Standard delay format) provides another means for specifying the inputs delays of gates and interconnects. Timing Constraints can also be provided, which includes a set of input constraints that are applied which define the desired timing that is envisioned from the digital circuit under consideration.

These input models 502 are provided for processing by the TSO master 510 and a plurality of TSO clients 540. Integrated MMMC timing closure functionalities are provided in a single software session using this approach, where the system performs (i) Signoff Analysis, Debugging, (ii) Manual ECO and (iii) Physical TSO Optimization for a large number of MMMC views in single software session.

In operation, the TSO master starts a TSO session at 512, which triggers the single integrated tool session for the EDA tool process (TSO master 510) that acts as controller for the complete flow. The TSO master 510 submits triggers processing by multiple remote processes (TSO clients) over the network (e.g., over a TSO client network channel). At the master TSO, at 514, setup is performed for the TSO master data read of the input models 502.

At 516, processing is performed, e.g., for reporting, manual ECOs, and/or debugging. In some embodiments, an interactive prompt/access (e.g., an interactive shell) is provided to the master TSO processing. The processing by the TSO master may include merging of reports, performing what-if ECO processing, addition, and/or removal of view.

At 518, TSO runs may be initiated. These actions perform the timing signoff and optimization operations based upon the ECO data provided by the TSO clients. At 520, additional processing may be performed at the TSO master, including many of the same actions previously taken at 516 to perform reporting, manual ECOs, and/or debugging. In some embodiments, an interactive prompt/access (e.g., a DMMMC interactive shell) is provided to perform the additional master TSO processing. Such additional processing include, for example, reporting, what-if ECO processing, manual ECOs, sourcing of the ECO file, debugging, addition/removal of views, and/or generation of signoff data.

At the TSO clients 540, setup of the TSO client is performed at 542. This action includes setups based at least in part on the view configurations that are assigned to the specific client. This may involve execution of a command script to the TSO client having commands and data to perform the client processing. The data operated upon by the client may include one or more views, (view definition data), timing properties, and/or design data. At 544, a design may be restored and/or loading performed of a full timing analysis. At 546, ECOs may be committed from the master. Thereafter, at 548, the TSO client generates post-ECO reporting.

The TSO client may generate certain outputs to be consumed by the TSO master. For example, Parasitic data 532 (e.g., RC-DB) may be generated by the TSO-client 540. In addition, constraint data 534 (e.g., minimal constraints for all modes) may be generated by the TSO client and provided to the ISO master. Timing derate data 536 (e.g., timing derates for all delay corners) can also be generated. Finally, ECO-DBs 538 (e.g., ECO-DBs for all MMMC views) are generated by the TSO clients. Some or all of this data can be generated on-demand from TSO client sessions automatically, e.g., without user intervention. The data can be generated on-demand as required by ECO optimization processing.

The parasitic data can be automatically generated in some embodiments. Instead of reading huge SPEF files for every corner by itself, the TSO master can poll each TSO client for active RC-corner and corresponding parasitic data (RCDB). The TSO master queries one client each for each of the RC-corner required. This is major performance boost over previous solution that required reading 10 s of corner huge SPEF file taking hours.

With regards to the minimal constraint data, instead of reading full MMMC advanced constraints scripts (e.g., tcl (tool command language) constraint scripts), the TSO master polls TSO clients for active constraint modes. The TSO master triggers to write minimal constraint data on one client each for each of the constraint mode required. This also provides another performance improvement over previous solutions that required reading lengthy tcl constraints for each constraint mode.

Regarding the timing derate data, instead of reading scripts for timing derate for each delay corner, the TSO master auto-triggers to write timing derate data on one client each for each of the delay corner required. This also gives another performance improvement over previous solution that required reading timing derate scripts for each delay corner.

For the ECO-DB Data, instead of requiring the user to generate the ECO-DB per view to start the optimization step, the TSO master auto-triggers ECO-DB generation on clients in parallel to loading MMMC design on master. This provides performance improvement over previous solution by using pre-generated ECO-DB. Also user does not have to generate separate ECO-DB since new solution maintains create/delete of ECO-DB automatically wherever needed. E.g. Next TSO step reuse the ECO-DB from previous TSO/auto-ECO-DB write steps. Also if manual ECO are performed in between by user, then ECO-DB is re-generated for next TSO step.

As previously noted, there are various types of ECO data that are generated within the illustrative system. Some or all of the ECO data in the system may correspond to the Eco-DB data 538 and/or the ECO file 504.

The ECO-DB data corresponds to light-weight timing criticality data for the MMMC views. This is used by the TSO engine (e.g., TSO master) to identify ECOs.

Physical ECO data may also be generated. Physically aware ECOs are generated when LFE/DEF data or placed/routed data are provided as inputs. ECOs performed in this mode leads to more predictable timing closure.

Logical ECO data may also be generated. In absence of physical data, Logical ECOs are generated as output without any placement directives. Implementation tool is free to realize desired location for such ECOs.

Timing reports 506 (e.g., merged timing reports) may be generated by the system. In some embodiments, the most basic output format of STA software is a set of timing reports that classify the whole design into various number of paths (subsections of digital circuits) and then state whether each path is meeting the set constraints. There can be various other report formats to identify timing of design.

In the inventive system, ECOs are performed on smaller sets of MMMC views while keeping all the views of the netlist data consistent. This provides the capability to interactively analyze and perform manual ECOs on smaller set of MMMC views of user's interest. Once the user completes his/her interaction, the system permits switching to interact with another set of views, interacting with all views or exiting the session.

In some embodiments, the ECOs performed on selected critical views can be pushed to remaining views in fast update manner to keep all MMMC Views clients DB in sync but does not incur significant cost of DB sync. This provides a major usability improvement over previous solution that did not support selective view ECO updates.

In some embodiments, consecutive TSO optimization iterations can be performed in the same software session. These TSO optimization iterations may pertain, for example, to leakage, DRV, setup, and/or hold. The illustrative system permits consecutive TSO optimization iterations in same software session in any order while maintaining signoff accuracy timing results at each step. As noted above, the TSO clients are kept alive so that additional interactive access is provided for additional actions that may need to be performed by the TSO master. This provides a significant usability improvement over previous solutions which required separate software sessions for consecutive TSO or else it compromised accuracy due to estimated timing numbers for consecutive TSO run.

Some embodiments permits the creation of concurrent MMMC view-configurations dynamically from existing non-MMMC STA sessions. As previously noted, each of the TSO master and/or client may load/restore prior session data. The prior session data may pertain to non-MMMC STA sessions. This approach can be implemented by triggering multiple clients to load non-MMMC STA data for different views (views 1 . . . n), where the TSO master combines the data for the multiple views into a multi-view configuration. This means that the inventive system is able to auto-generate 'multi-view' MMMC view-definition/configuration from multiple 'single view' STA run configurations.

In some embodiments, the user assigns names for MMMC mode/corner object within existing single view configurations during the STA run itself using set of variables and saves the session (e.g., to disk). When such single view configurations are loaded into TSO master session, the system stitches all single view configurations into a merged multi-view MMMC configuration. This provides a significant usability enhancement over previous solution that required user to manually create separate multi-view MMMC view configuration for TSO optimization.

As noted above, the inventive system provides an approach for establishing the TSO master concurrent MMMC session in parallel to full timing analysis on clients. This adds the capability to establish the TSO master MMMC session in parallel to clients performing full timing analysis runs for a large number of views. The TSO master design DB can be created by using concurrent MMMC scripts to perform full single view timing analysis on TSO clients. Alternatively, multiple single view sessions can be saved on the same disk by previous STA runs using distributed MMMC or single view run scripts. In some embodiment, such saved sessions may be on the same physical disk or on multiple disks over the network accessible from the master.

This approach provides a significant improvement since conventional approaches did not provide the capability to re-use saved STA run sessions from performing TSO-ECO optimization.

Some embodiments perform automated ECO-DB generation at clients in parallel to the TSO master setup. The inventive system can perform in parallel both (i) ECO-DB generation by TSO clients and (ii) master processing corner/mode data. In some embodiments, the system improves overall processing efficiency by recognizing that reading large numbers of views data together in a master design session takes significant time in comparison to each TSO client loading single view data and then generating the ECO-DB. This provides significant performance advantages when performing TSO runs over prior solutions that either required additional sessions or was only able to generating the ECO-DB sequentially after a master MMMC setup. The ECO-DB generation can be in any format, including for example, at least one of GBA (graph based analysis), PBA (path based analysis), AOCV, SOCV, an/or pathgroup. Some embodiments pertain to an approach for implementing a physical TSO database using existing logical STA sessions. The physical TSO design can be created by combining both (i) saved logical STA sessions and (ii) physical data. This provides a major functional advantage for implementing physically aware ECO optimization after signoff STA runs, and provides flexibility for a user to manage physical design context and timing signoff as independent of each other during final timing closure. Known approaches do not include the capability to use previously saved logical DB data and requires user to setup new physical DB loading scripts to get physical data configuration.

In some embodiments, the physical TSO database is implemented by first obtaining the physical DB context data. This can be performed, for example, by having user provide the physical DB context data as LEF/DEF files. Next, the TSO master starts loading the design from a previously saved logical STA session. The initial global settings are loaded, e.g., from a logical session. The physical DB loading flow settings are turned on according to the LEF/DEF data specified at the previous step. Next, the LEF files (e.g., the user-provided LEF files) are inserted/read just before design loading (e.g., Verilog design loading). This permits the design DB to be aware of the physical context from the start. After the full Verilog/design load step, the TSO master then loads full chip and/or block DEF files and merges them into full chip placement data. This therefore creates a full physical DB.

Therefore, what has been described is an improved approach to implement timing signoff and optimization. The present embodiment provides integrated MMMC timing closure functionality in a single software session. The inventive system provides the capability to perform functions such as signoff analysis, debugging, ECO, and TSO optimization for a large number of MMMC views in single software session. This is highly sought-after functionality improvement over previous solutions (2-pass or 3-pass) that required multiple software sessions.

For the ECO-DB Data, instead of requiring the user to generate the ECO-DB per view to start the optimization step, the TSO master auto-triggers ECO-DB generation on clients in parallel to loading MMMC design on master. In the inventive system, ECOs are performed on smaller set of MMMC views while keeping all the views netlist data consistent. This provides the capability to interactively analyze and perform manual ECOs on smaller set of MMMC views of user's interest.

In some embodiments, the ECOs performed on selected critical views can be pushed to remaining views in fast update manner to keep all MMMC Views clients DB in sync but does not incur significant cost of DB sync. In some embodiments, consecutive TSO optimization iterations can be performed in the same software session. Some embodiments permits the creation of concurrent MMMC view-configurations dynamically from existing non-MMMC STA sessions. Some embodiments perform automated ECO-DB generation at clients in parallel to the TSO master setup. Some embodiments pertain to an approach for implementing a physical TSO database using existing logical STA sessions.

System Architecture Overview

Figure 6:
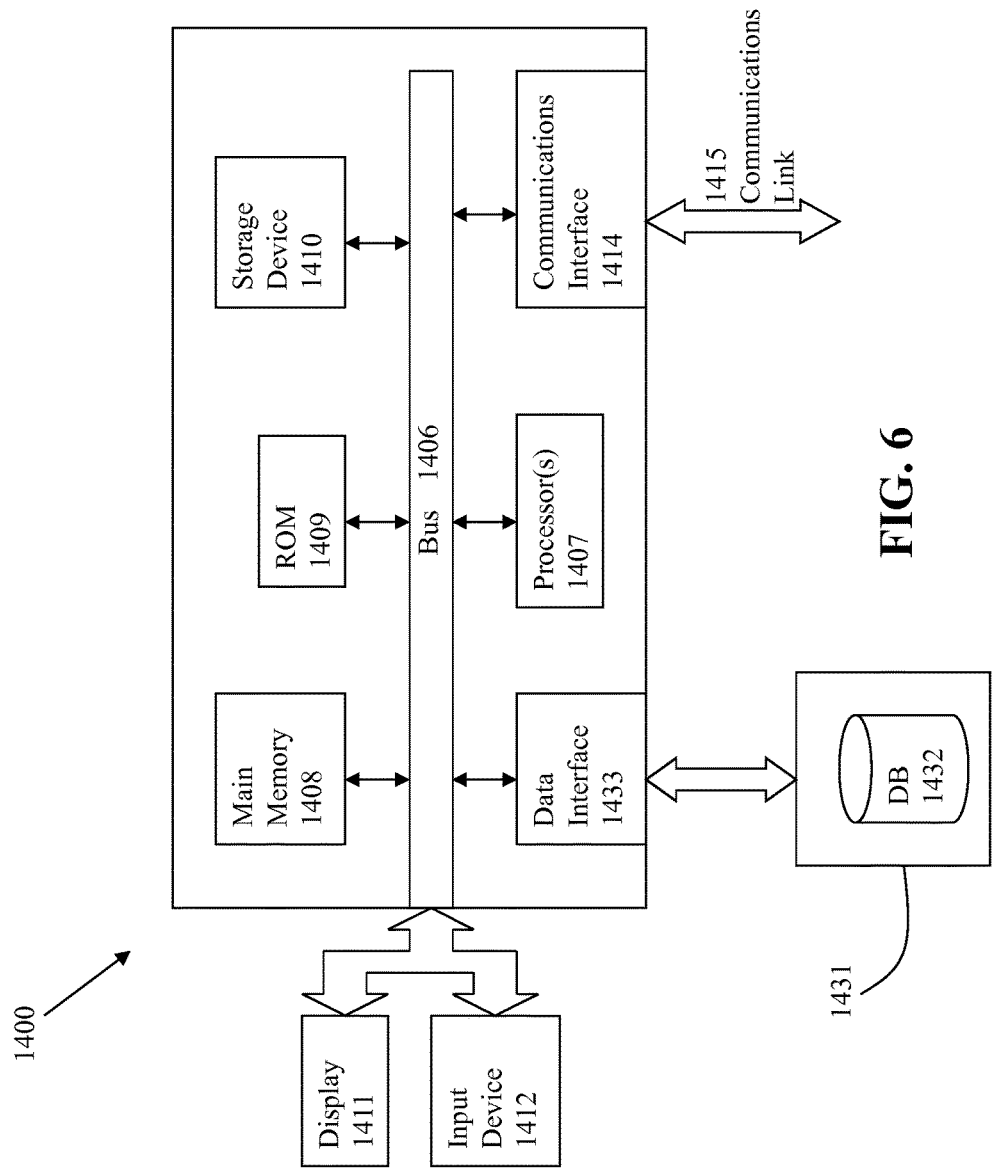
FIG. 6 shows an architecture of an example computing system with which the invention may be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be accessed in a computer readable medium 1431 using a data interface 1433.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for processing an electronic circuit design, comprising:

starting, at a master processing entity comprising at least a micro-processor and stored at least partially in memory, a single integrated session to perform timing signoff on an electronic design, wherein the single integrated session is initiated by the master processing entity, and the single integrated session corresponds to a common network communications session established by the master processing entity and accessed by a plurality of client entities;

reducing constraint data for timing signoff at least by polling, by the master processing entity, the plurality of client entities for a plurality of modes that are active for the plurality of client entities and by writing a reduced set of constraint data for the plurality of modes to the plurality of client entities;

processing at least one MMMC (multi-mode multi-corner) view for the electronic design with the reduced set of constraint data to generate analysis data at the plurality of client entities that are started by the master processing entity and connected to the common network communications session of the single integrated session; and performing the timing signoff at the master processing entity in the single integrated session, without requiring clients to perform a multi-pass process that runs one or more EDA (electronic design automation) application programs in multiple sessions, wherein performing the timing signoff is implemented using the analysis data received from the plurality of client entities resulting from processing the at least one MMMC view, and the one or more EDA application programs stored on one or more servers.

2. The method of claim 1, wherein modifications to the electronic design are generated at the master processing entity and the modifications to the electronic design are received at the plurality of client entities for processing.

3. The method of claim 2 in which the data corresponding to the modifications to the electronic design comprises ECO (engineering change order) data, wherein the ECO data is generated on the plurality of client entities in parallel to operation of the master processing entity.

4. The method of claim 1, wherein a physical TSO (timing signoff optimization) database is generated using a logical STA session.

5. The method of claim 4, wherein the physical TSO database is generated by combining the logical STA session with physical data.

6. The method of claim 1, wherein TSO data is generated on-demand by the plurality of client entities.

7. The method of claim 6, wherein the TSO (timing signoff) data comprises at least one of parasitic data, minimal constraint data, timing derate data, and ECO-DB (engineering-change-order-database) data.

8. The method of claim 1, further comprising switching from the smaller set of MMMC views to a complete view of the electronic design, wherein ECOs are performed on smaller sets of MMMC views while keeping views of netlist data consistent.

9. The method of claim 8, further comprising:

performing, at the master processing entity, one or more manual engineer change orders in the single integrated session, wherein the single integrated session comprises a single EDA (electronic design automation) tool session to which the plurality of client entities are attached.

10. The method of claim 1, further comprising:

triggering, at the master processing entity, automated generation of engineering change order data at two or more client entities of the plurality of client entities; and populating one or more engineer change order databases for a plurality of MMMC views including the at least one MMMC view with the engineering change order data from the two or more client entities.

11. A computer program product that includes a computer readable medium, the computer readable medium comprising a plurality of computer instructions which, when executed by a processor, cause the processor to execute performing a set of acts for processing an electronic circuit design, the set of acts comprising:

starting, at a master processing entity comprising at least a micro-processor and stored at least partially in memory, a single integrated session to perform timing signoff on an electronic design, wherein the single integrated session is initiated by the master processing entity, and the single integrated session corresponds to a common network communications session established by the master processing entity and accessed by a plurality of client entities;

reducing constraint data for timing signoff at least by polling, by the master processing entity, the plurality of client entities for a plurality of modes that are active for the plurality of client entities and by writing a reduced set of constraint data for the plurality of modes to the plurality of client entities;

processing at least one MMMC (multi-mode multi-corner) view for the electronic design with the reduced set of constraint data to generate analysis data at the plurality of client entities that are started by the master processing entity and connected to the common network communications session of the single integrated session; and performing the timing signoff at the master processing entity in the single integrated session, without requiring clients to perform a multi-pass process that runs one or more EDA (electronic design automation) application programs in multiple sessions, wherein performing the timing signoff is implemented using the analysis data received from the plurality of client entities resulting from processing the at least one MMMC view, and the one or more EDA application programs stored on one or more servers.

12. The computer program product of claim 11, wherein modifications to the electronic design are generated at the master processing entity and the modifications to the electronic design are received at the plurality of client entities for processing.

13. The computer program product of claim 12 in which the data corresponding to the modifications to the electronic design comprises ECO (engineering change order) data, wherein the ECO data is generated on the plurality of client entities in parallel to operation of the master processing entity.

14. The computer program product of claim 11, wherein a physical TSO (timing signoff optimization) database is generated using a logical STA session.

15. The computer program product of claim 14, wherein the physical TSO database is generated by combining the logical STA session with physical data.

16. The computer program product of claim 11, wherein TSO data is generated on-demand by the plurality of client entities.

17. The computer program product of claim 16, wherein the TSO (timing signoff) data comprises at least one of parasitic data, minimal constraint data, timing derate data, and ECO-DB (engineering-change-order-database) data.

18. The computer program product of claim 11, wherein ECOs are performed on smaller sets of MMMC views while keeping views of netlist data consistent.

19. The computer program product of claim 18, wherein the process further comprises switching from the smaller set of MMMC views to a complete view of the electronic design.

20. The computer program product of claim 11, wherein consecutive TSO optimization iterations are performed in the integrated session.

21. A system for processing an electronic circuit design, comprising:
a memory comprising a storage structure to store a plurality of computer instructions; and
a processor, wherein the processor is configured to execute the plurality of instructions which, when executed by the processor, causes a master processing entity to:
start, at a master processing entity comprising at least the processor and stored at least partially in memory, a single integrated session to perform timing signoff on an electronic design, wherein the single integrated session is initiated by the master processing entity, and the single integrated session corresponds to a common network communications session established by the master processing entity and accessed by a plurality of client entities,
reduce constraint data for timing signoff at least by polling, by the master processing entity, the plurality of client entities for a plurality of modes that are active for the plurality of client entities and by writing a reduced set of constraint data for the plurality of modes to the plurality of client entities;
process at least one MMMC (multi-mode multi-corner) view for the electronic design with the reduced set of constraint data to generate analysis data at the plurality of client entities that are started by the master processing entity and connected to the common network communications session of the single integrated session, and
perform the timing signoff at the master processing entity in the single integrated session, without requiring clients to perform a multi-pass process that runs one or more EDA (electronic design automation) application programs in multiple sessions, wherein performing the timing signoff is implemented using the analysis data received from the plurality of client entities resulting from processing the at least one MMMC view, and the one or more EDA application programs stored on one or more servers.

22. The system of claim 21, wherein modifications to the electronic design are generated at the master processing entity and the modifications to the electronic design are received at the plurality of client entities for processing.

23. The system of claim 22 in which the data corresponding to the modifications to the electronic design comprises ECO (engineering change order) data, wherein the ECO data is generated on the plurality of client entities in parallel to operation of the master processing entity.

24. The system of claim 21, wherein a physical TSO (timing signoff optimization) database is generated using a logical STA session.

25. The system of claim 24, wherein the physical TSO database is generated by combining the logical STA session with physical data.

26. The system of claim 21, wherein TSO data is generated on-demand by the plurality of client entities.

27. The system of claim 26, wherein the TSO (timing signoff) data comprises at least one of parasitic data, minimal constraint data, timing derate data, and ECO-DB (engineering-change-order-database) data.

28. The system of claim 21, wherein ECOs are performed on smaller sets of MMMC views while keeping views of netlist data consistent.

29. The system of claim 28, wherein the plurality of instructions, when executed by the processor, further causes the processor to switch from the smaller set of MMMC views to a complete view of the electronic design.

30. The system of claim 21, wherein consecutive TSO optimization iterations are performed in the integrated session.

\* \* \* \* \*